United States Patent
Lan et al.

(10) Patent No.: US 12,382,491 B2
(45) Date of Patent: *Aug. 5, 2025

(54) MULTI-USER (MU) ENHANCED DISTRIBUTED CHANNEL ACCESS (EDCA) TERMINATION SIGNALING

(71) Applicant: Avago Technologies International Sales Pte. Limited, Singapore (SG)

(72) Inventors: Zhou Lan, San Jose, CA (US); Chunyu Hu, San Jose, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 63 days.

This patent is subject to a terminal disclaimer.

(21) Appl. No.: 18/446,033

(22) Filed: Aug. 8, 2023

(65) Prior Publication Data

US 2023/0389068 A1    Nov. 30, 2023

Related U.S. Application Data

(63) Continuation of application No. 17/540,908, filed on Dec. 2, 2021, now Pat. No. 11,765,767, which is a continuation of application No. 16/789,003, filed on Feb. 12, 2020, now Pat. No. 11,219,060.

(60) Provisional application No. 62/817,387, filed on Mar. 12, 2019.

(51) Int. Cl.
*H04W 74/04* (2009.01)
*H04W 84/12* (2009.01)

(52) U.S. Cl.
CPC ............ *H04W 74/04* (2013.01); *H04W 84/12* (2013.01)

(58) Field of Classification Search
CPC .... H04W 74/04; H04W 84/12; H04W 74/006
See application file for complete search history.

(56) References Cited

U.S. PATENT DOCUMENTS

| | | | |
|---|---|---|---|
| 11,219,060 B2 | 1/2022 | Lan et al. | |
| 11,765,767 B2 * | 9/2023 | Lan | H04W 74/006 370/329 |
| 2014/0378121 A1 | 12/2014 | Alanen et al. | |
| 2016/0381704 A1 | 12/2016 | Chu et al. | |
| 2017/0094677 A1 | 3/2017 | Liu et al. | |
| 2017/0202023 A1 | 7/2017 | Zhou et al. | |
| 2018/0139699 A1 | 5/2018 | Choi et al. | |

(Continued)

FOREIGN PATENT DOCUMENTS

| | | |
|---|---|---|
| CN | 103023555 A | 4/2013 |
| CN | 109076611 A1 | 12/2018 |

(Continued)

OTHER PUBLICATIONS

Chinese office action on CNN 202010160937.0 dated Mar. 15, 2022.

(Continued)

*Primary Examiner* — Mohammad S Anwar
(74) *Attorney, Agent, or Firm* — Foley & Lardner LLP

(57) ABSTRACT

In some aspects, the disclosure is directed to methods and systems for early termination of multi-user enhanced distributed channel access parameter application for one or more stations or devices. In various implementations, referred to as un-solicited or solicited termination, the multi-user enhanced distributed channel access timeout period may be terminated early by an access point device, or by a non-access point station or device, respectively.

20 Claims, 8 Drawing Sheets

(56) References Cited

U.S. PATENT DOCUMENTS

2019/0037595 A1    1/2019  Cherian et al.
2019/0223219 A1    7/2019  Ahn et al.

FOREIGN PATENT DOCUMENTS

WO    WO-2018/056771 A1    3/2018
WO    WO-2018/075196 A1    4/2018
WO    WO-2019/005828 A1    1/2019

OTHER PUBLICATIONS

EP Office Action for Application No. 20 161 914.5-1215 mailing date Jul. 26, 2023, 5 pages.
European Search Report on non-Foley case related to U.S. Appl. No. 16/789,003 dated Jul. 24, 2020 (8 pages).
Non-Final Office Action on U.S. Appl. No. 17/540,908 Dtd Dec. 19, 2022.
Notice of Allowance on U.S. Appl. No. 16/789,003 Dtd Sep. 1, 2021.
Notice of Allowance on U.S. Appl. No. 17/540,908 Dtd May 3, 2023.
Zhou Lan et al: "Comment resolution on CID 20175", EEE 802.11-19/0427r0, Mar. 10, 2019 (Mar. 10, 2019), XP055744774.

* cited by examiner

MULTI-USER (MU) ENHANCED
DISTRIBUTED CHANNEL ACCESS (EDCA)
TERMINATION SIGNALING

RELATED APPLICATIONS

This application claims the benefit of and priority as a continuation to U.S. application Ser. No. 17/540,908, entitled "Multi-User (MU) Enhanced Distributed Channel Access (EDCA) Termination Signaling," filed Dec. 2, 2021; which is a continuation of U.S. patent application Ser. No. 16/789,003, entitled "Multi-User (MU) Enhanced Distributed Channel Access (EDCA) Termination Signaling," filed Feb. 12, 2020; which claims priority to U.S. Provisional Application No. 62/817,387, entitled "MU EDCA Termination Signaling," filed Mar. 12, 2019, the entirety of which is incorporated by reference herein.

FIELD OF THE DISCLOSURE

This disclosure generally relates to systems and methods for wireless communications. This disclosure relates to systems and methods for signaling termination of enhanced distributed channel access parameter periods for wireless communications.

BACKGTROUND OF THE DISCLOSURE

Some implementations of wireless communications, such as the IEEE 802.11ax standard, utilize multi-user (MU) enhanced distributed channel access (EDCA) protocols for channel coordination. For example, in the 802.11ax standard, an access point (AP) may broadcast a frame (e.g., beacon frame, probe response frame, etc.) to one or more stations (STA) with a MU EDCA Parameter Set of parameters. The parameter sets may be defined for one or more access categories (ACs), which may have lower priority with respect to legacy EDCA parameters, to favor uplink MU transmissions.

STAs receiving these parameters may use the corresponding parameters to an AC when transmitting data frames having a corresponding quality of service (QoS) setting (e.g., in a high-efficiency (HE) trigger based physical protocol data unit (PPDU) frame), for example upon receipt of a basic trigger frame. The STA may use the MU EDCA parameters for a duration (e.g., timeout value) defined in the HEMUEDCATimer field of the parameter set for the corresponding AC.

However, if the AP wants the corresponding STA to terminate the use of the current MU EDCA parameters (e.g., to switch to single user (SU) operations), prior to the timeout timer expiration, in typical systems, there may be no way to communicate this command. The STA must wait for the timeout to expire without receiving a trigger, and may not be able to switch to SU mode for transmissions. As the timeout period may be relatively long (e.g., 2 seconds), this may result in significant delays in communications.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

The following IEEE standard(s), including any draft versions of such standard(s), are hereby incorporated herein by reference in their entirety and are made part of the present disclosure for all purposes: IEEE P802.11ac™; and IEEE P802.11ax™. Although this disclosure may reference aspects of these standard(s), the disclosure is in no way limited by these standard(s).

For purposes of reading the description of the various embodiments below, the following descriptions of the sections of the specification and their respective contents may be helpful:

Section A describes embodiments of systems and methods for enhanced distributed channel access termination signaling; and
 Section B describes a network environment and computing environment which may be useful for practicing embodiments described herein.

Enhanced Distributed Channel Access Termination Signaling

Some implementations of wireless communications, such as the IEEE 802.11ax standard, utilize multi-user (MU) enhanced distributed channel access (EDCA) protocols for channel coordination. For example, in the 802.11ax standard, an access point (AP) may broadcast a frame (e.g., beacon frame, probe response frame, etc.) to one or more stations (STA) with a MU EDCA Parameter Set of parameters. The parameter sets may be defined for one or more access categories (ACs), which may have lower priority with respect to legacy EDCA parameters, to favor uplink MU transmissions.

Figure 1:
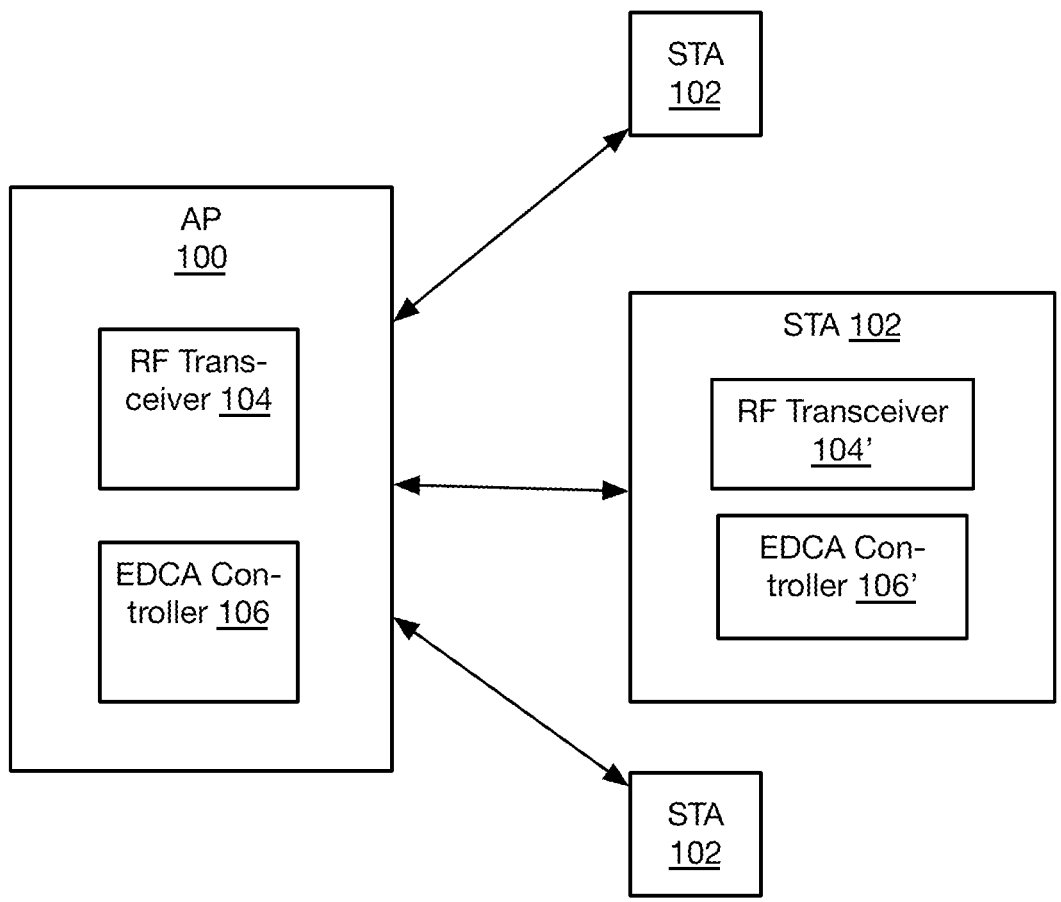
FIG. 1 is a block diagram depicting an embodiment of a network environment for multi-user enhanced distributed channel access communications.

FIG. 1 is a block diagram depicting an embodiment of a network environment for multi-user enhanced distributed channel access communications. An access point (AP 100) may communicate with one or more devices (stations (STA)

102) via radiofrequency transceiver hardware 104, 104'. The AP and, in some implementations, STAs may include an EDCA controller 106. EDCA controller 106 may comprise hardware and/or software for setting, broadcasting, and/or receiving EDCA parameter sets and controlling data transmission timing and fragmentation according to the parameters.

STAs receiving the EDCA parameters may use the corresponding parameters to an AC when transmitting data frames having a corresponding quality of service (QoS) setting (e.g., in a high-efficiency (HE) trigger based physical protocol data unit (PPDU) frame), for example upon receipt of a basic trigger frame. The STA may use the MU EDCA parameters for a duration (e.g., timeout value) defined in the HEMUEDCATimer field of the parameter set for the corresponding AC.

However, if the AP wants the corresponding STA to terminate the use of the current MU EDCA parameters (e.g., to switch to single user (SU) operations), prior to the timeout timer expiration, in typical systems, there may be no way to communicate this command. The STA must wait for the timeout to expire without receiving a trigger, and may not be able to switch to SU mode for transmissions. As the timeout period may be relatively long (e.g., 2 seconds), this may result in significant delays in communications.

Figure 2:
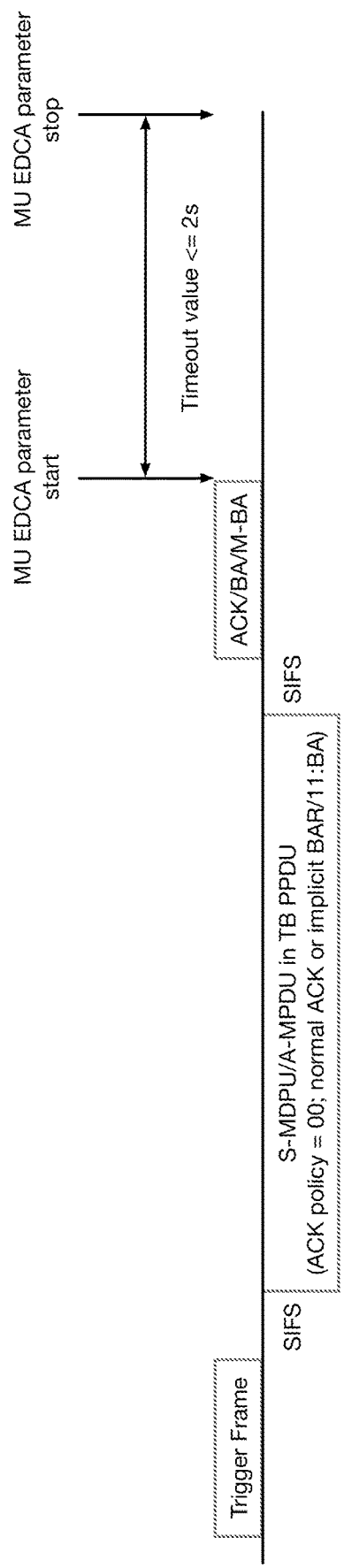
FIG. 2 is an illustration of timing of communications, according to an implementation of multi-user enhanced distributed channel access communications.

For example, FIG. 2 is an illustration of timing of communications, according to an implementation of multi-user enhanced distributed channel access communications. As shown, a trigger frame may be broadcast to one or more STAs by an AP. The trigger frame may comprise one or more EDCA parameter sets, with parameters including access categories, contention window minimums and maximums, maximum transmit opportunities (TXOP), arbitration interframe spacing number (AIFSN) values, and/or any other such parameters. As shown, the MU EDCA parameters may be applied for a designated timeout period (e.g., MU EDCA parameter start to MU EDCA parameter stop), which may be of relatively long duration (e.g., 2 seconds, in some implementations). The STAs may continue to apply the MU EDCA parameters during this period, and, in systems not utilizing the implementations discussed herein, the AP may be unable to terminate this period early.

Instead, the systems and methods discussed herein provide for early termination of EDCA parameter application for one or more STAs. In various implementations, referred to as un-solicited or solicited termination, the MU EDCA timeout period may be terminated early by an AP or by a non-AP STA, respectively.

For example, in an implementation of un-solicited termination, initiated by an AP, upon determining not to trigger one or more STAs during the remaining MU EDCA timeout period (e.g. due to scheduling requirements or otherwise), the AP may signal the STA or STAs that the current MU EDCA timeout period is terminated by transmitting a termination signal. The termination signal may be carried in a special trigger frame, in some implementations, or may be carried in an MU EDCA management frame (e.g., an action frame) or another frame that carries an MU EDCA Control field (e.g., an A-control field).

Figure 3:
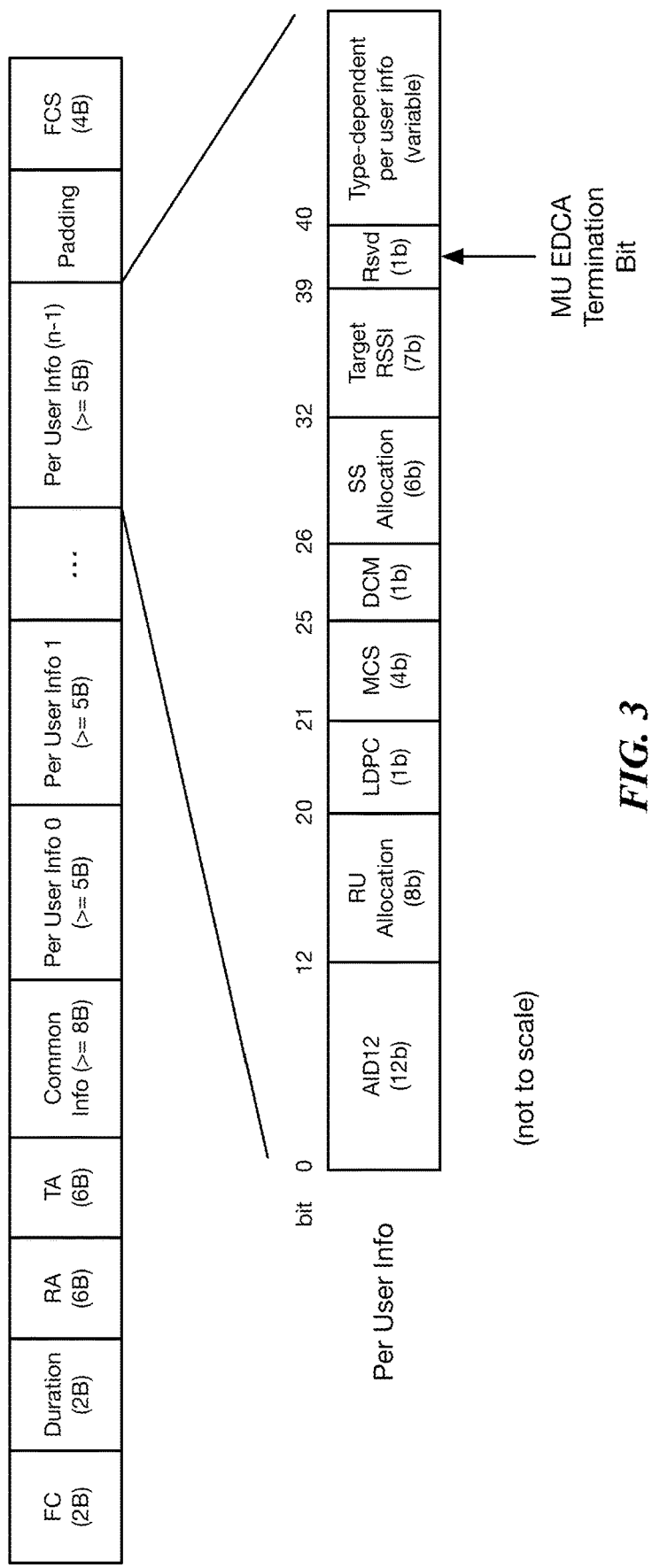
FIG. 3 is an illustration of a basic trigger frame carrying enhanced distributed channel access termination signaling, according to some implementations.

FIG. 3 is an illustration of a basic trigger frame carrying EDCA termination signaling, according to some implementations. Termination signaling with the trigger frame may be implemented in various ways, including explicitly by using the reserved bit (e.g. bit 39 in the per user info portion of the frame) as an MU EDCA termination flag; or implicitly, by using a reserved or predetermined value in the RU allocation field (e.g., bits 12-19 of the per user info portion), or by using a reserved combination of the per user info fields.

Figure 4:
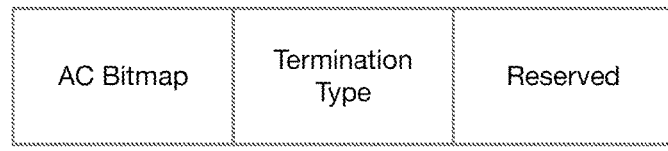
FIG. 4 is an illustration of a multi-user enhanced distributed channel access management frame, according to some implementations.

In another implementation, an MU EDCA management frame may be used for termination signaling. FIG. 4 is an illustration of an MU EDCA management frame, according to some implementations. The frame may be similar to or may comprise an HE Action frame, in some implementations. As shown, the frame may comprise an AC bitmap field, specifying the ACs whose MU EDCA timer will be terminated. The terminate type may comprise a flag or identifier for one of a predetermined plurality of termination types (e.g., solicited or unsolicited, as discussed above).

In still another implementation, the termination signal may be carried by an MU EDCA control field within a frame. The MU EDCA control field may comprise or be similar to an A-control field. As with the MU EDCA management frame shown in FIG. 4, the MU EDCA control field may comprise an AC bitmap field and a termination type field.

As discussed above, termination does not necessarily have to be initiated by the AP. In an implementation of solicited termination, a non-AP STA may utilize OFDMA random access (e.g., as discussed in 802.11ax draft 4.0, incorporated herein by reference) to signal the AP that the STA wants to terminate the current MU EDCA timeout period. The STA may use other ACs that are not under the MU EDCA to send frames to signal the AP that the STA wants to terminate the current MU EDCA timeout period, in some implementations. These frames may include MU EDCA management frames (e.g., Action frames), as discussed above in connection with FIG. 4 or frames carrying an MU EDCA control field (e.g., A-control field).

Figure 5:
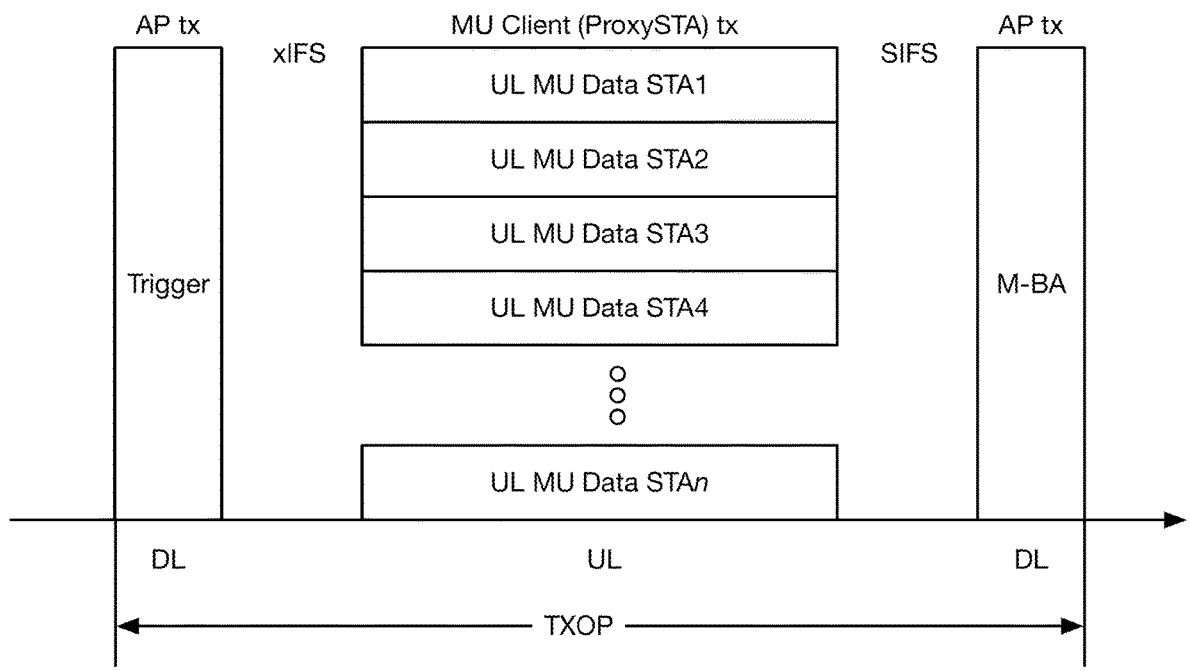
FIG. 5 is an illustration of multi-user enhanced distributed channel access communications data transmissions, according to some implementations.

As discussed above, in some implementations, unassociated STAs may use uplink OFDMA random access (UORA) signaling to perform probe requests. The MU EDCA management frame or control field may be sent in a similar manner, and accordingly, may be consistent with link establishment procedures and not interfere with other communications. FIG. 5 is an illustration of multi-user enhanced distributed channel access communications data transmissions, according to some implementations. An AP may transmit trigger frames to protect its reception of data frames from STAs. Trigger based uplink OFDMA signaling may also allow more distant STAs to communicate with the AP and receive acknowledgements.

Figure 6:
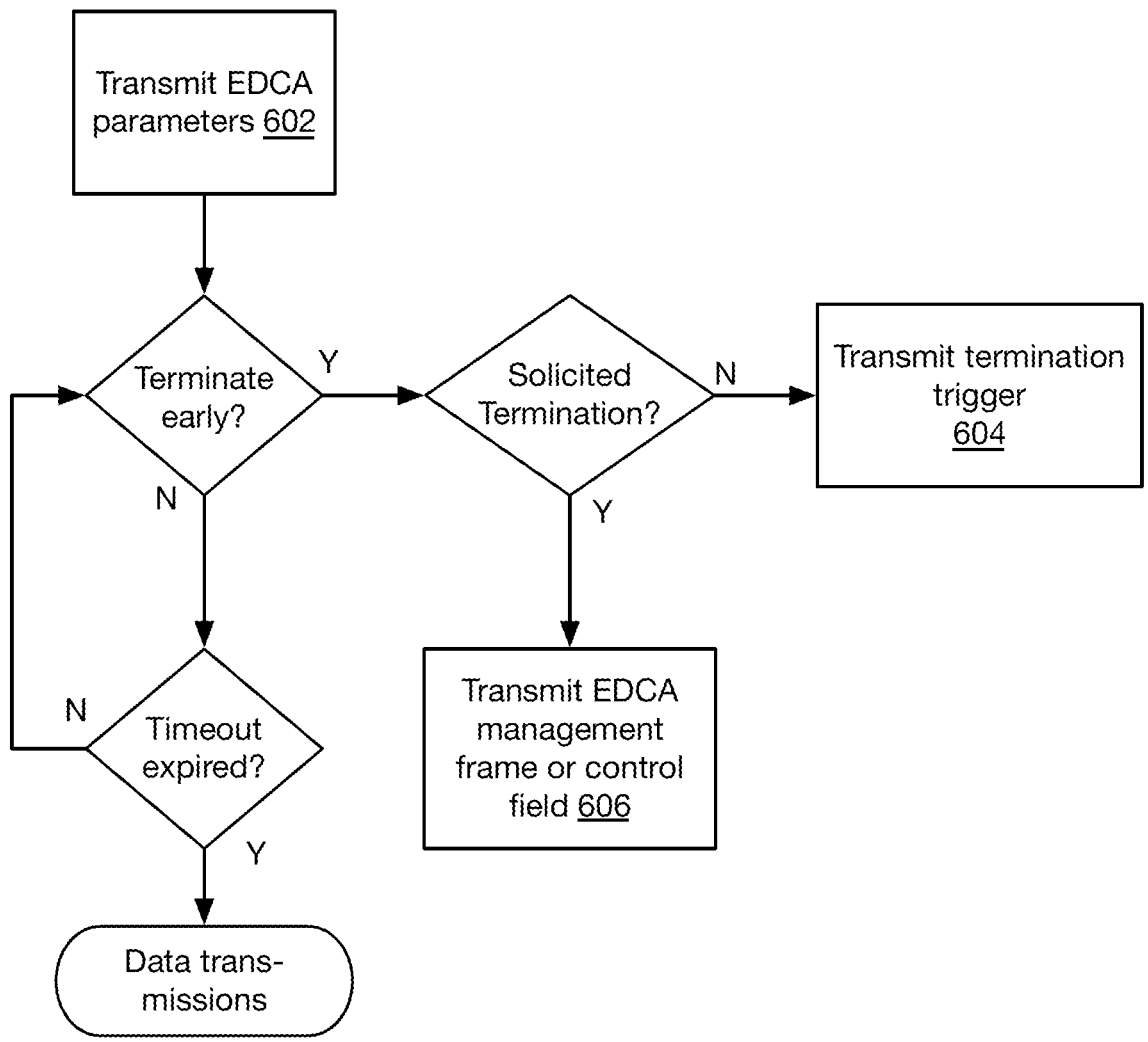
FIG. 6 is a flow chart of a method for multi-user enhanced distributed channel access termination signaling, according to some implementations.

FIG. 6 is a flow chart of a method for multi-user enhanced distributed channel access termination signaling, according to some implementations. As discussed above, at step 602, an AP may transmit an EDCA parameter set, e.g., during a beacon frame. The timeout period may begin and, if not terminated early, then normal data transmissions may be utilized. If the timeout period is to be terminated early, then in some implementations, an AP may transmit a termination trigger at step 604 (unsolicited termination). The termination trigger may comprise a trigger frame as discussed above in connection with FIG. 3, or an MU EDCA management frame or frame carrying an MU EDCA control field as discussed above in connection with FIG. 4. Conversely, in some implementations, an STA may terminate MU EDCA via solicited termination by transmitting an MU EDCA management frame or frame carrying an MU EDCA control field at step 606. The solicited termination may be transmitted via a probe request or in a similar manner to a probe request (e.g., UORA signaling).

Accordingly, the systems and methods discussed herein allow for early termination of MU EDCA parameters on a per-STA and/or per-AC basis, reducing delay in such cases compared to systems that must wait for expiration of the MU EDCA parameter timeout period.

In one aspect, the present disclosure is directed to a method for enhanced distributed channel access (EDCA) termination signaling. The method includes transmitting, by a first device to at least one other device, at least one EDCA parameter set. The method also includes determining, by the first device, to terminate EDCA mode prior to expiration of an EDCA timeout. The method also includes responsive to the determination, transmitting, by the first device to the at least one other device, a termination trigger comprising a predetermined bit value in a portion of a broadcast data frame.

In some implementations, the method includes determining not to trigger a transmission from a second device of the at least one other devices prior to expiration of the EDCA timeout. In a further implementation, the termination trigger comprises a basic trigger frame comprising the predetermined bit value. In another further implementation, the termination trigger comprises a multi-user EDCA management frame comprising the predetermined bit value. In still another further implementation, the termination trigger comprises a frame having a multi-user EDCA control field comprising the predetermined bit value. In yet still another further implementation, the at least one other devices comprise a plurality of devices, and the first device triggers a transmission from a third device of the plurality of devices during the EDCA mode.

In some implementations, the method includes determining to terminate EDCA mode prior to expiration of the EDCA timeout responsive to receiving, by the first device from a second device of the at least one other devices prior to expiration of the EDCA timeout, a request to terminate EDCA mode. In a further implementation, the request comprises a multi-user EDCA management frame. In another further implementation, the request comprises a frame comprising a multi-user EDCA control field. In still another further implementation, the request is transmitted according to an access category not subject to multi-user EDCA mode.

In another aspect, the present disclosure is directed to a system for enhanced distributed channel access (EDCA) termination signaling. The system includes a first device comprising a wireless communication interface and a processor. The processor is configured to: transmit, via the wireless communication interface to at least one other device, at least one EDCA parameter set; determine to terminate EDCA mode prior to expiration of an EDCA timeout; and responsive to the determination, transmit, via the wireless communication interface to the at least one other device, a termination trigger comprising a predetermined bit value in a portion of a broadcast data frame.

In some implementations, the processor is further configured to determine not to trigger a transmission from a second device of the at least one other devices prior to expiration of the EDCA timeout. In a further implementation, the termination trigger comprises a basic trigger frame comprising the predetermined bit value. In another further implementation, the termination trigger comprises a multi-user EDCA management frame comprising the predetermined bit value. In still another further implementation, the termination trigger comprises a frame having a multi-user EDCA control field comprising the predetermined bit value. In yet still another further implementation, the at least one other devices comprise a plurality of devices, and the first device triggers a transmission from a third device of the plurality of devices during the EDCA mode.

In some implementations, the processor is further configured to determine to terminate EDCA mode prior to expiration of the EDCA timeout responsive to receipt, via the wireless communication interface from a second device of the at least one other devices prior to expiration of the EDCA timeout, a request to terminate EDCA mode. In a further implementation, the request comprises a multi-user EDCA management frame. In another further implementation, the request comprises a frame comprising a multi-user EDCA control field. In still another further implementation, the request is transmitted according to an access category not subject to multi-user EDCA mode.

B. Computing and Network Environment

Figure 7A:
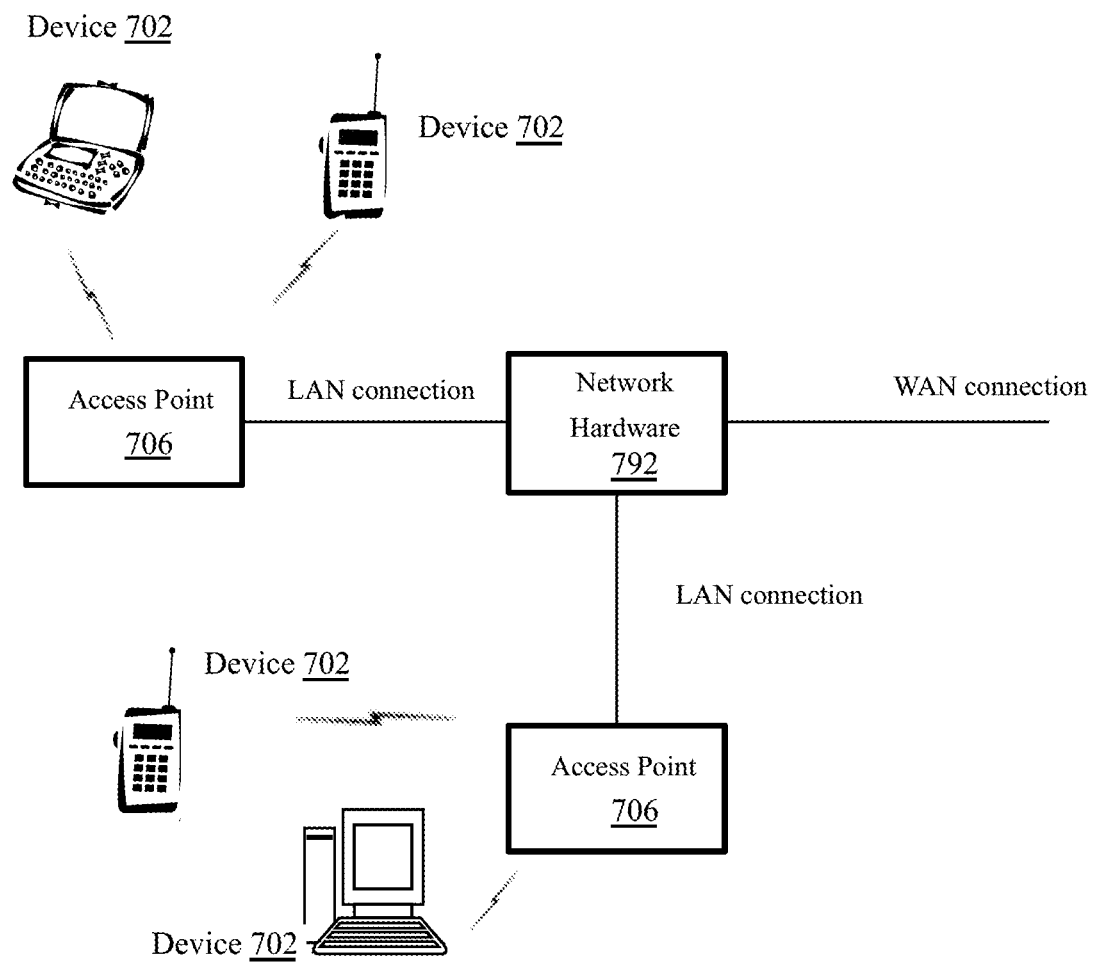
FIG. 7A is a block diagram depicting an embodiment of a network environment including one or more access points in communication with one or more devices or stations.

Having discussed specific embodiments of the present solution, it may be helpful to describe aspects of the operating environment as well as associated system components (e.g., hardware elements) in connection with the methods and systems described herein. Referring to FIG. 7A, an embodiment of a network environment is depicted. In brief overview, the network environment includes a wireless communication system that includes one or more access points 706, one or more wireless communication devices 702 and a network hardware component 792. The wireless communication devices 702 may for example include laptop computers 702, tablets 702, personal computers 702 and/or cellular telephone devices 702. The details of an embodiment of each wireless communication device and/or access point are described in greater detail with reference to FIGS. 7B and 7C. The network environment can be an ad hoc network environment, an infrastructure wireless network environment, a subnet environment, etc. in one embodiment.

The access points (APs) 706 may be operably coupled to the network hardware 792 via local area network connections. The network hardware 792, which may include a router, gateway, switch, bridge, modem, system controller, appliance, etc., may provide a local area network connection for the communication system. Each of the access points 706 may have an associated antenna or an antenna array to communicate with the wireless communication devices 702 in its area. The wireless communication devices 702 may register with a particular access point 706 to receive services from the communication system (e.g., via a SU-MIMO or MU-MIMO configuration). For direct connections (e.g., point-to-point communications), some wireless communication devices 702 may communicate directly via an allocated channel and communications protocol. Some of the wireless communication devices 702 may be mobile or relatively static with respect to the access point 706.

In some embodiments an access point 706 includes a device or module (including a combination of hardware and software) that allows wireless communication devices 702 to connect to a wired network using Wi-Fi, or other standards. An access point 706 may sometimes be referred to as an wireless access point (WAP). An access point 706 may be configured, designed and/or built for operating in a wireless local area network (WLAN). An access point 706 may connect to a router (e.g., via a wired network) as a stand-alone device in some embodiments. In other embodiments, an access point can be a component of a router. An access point 706 can provide multiple devices 702 access to a network. An access point 706 may, for example, connect to a wired Ethernet connection and provide wireless connections using radio frequency links for other devices 702 to utilize that wired connection. An access point 706 may be built and/or configured to support a standard for sending and receiving data using one or more radio frequencies. Those standards, and the frequencies they use may be defined by the IEEE (e.g., IEEE 802.11 standards). An access point may be configured and/or used to support public Internet hotspots, and/or on an internal network to extend the network's Wi-Fi signal range.

In some embodiments, the access points 706 may be used for (e.g., in-home or in-building) wireless networks (e.g., IEEE 802.11, Bluetooth, ZigBee, any other type of radio frequency based network protocol and/or variations thereof). Each of the wireless communication devices 702 may include a built-in radio and/or is coupled to a radio. Such wireless communication devices 702 and/or access points 706 may operate in accordance with the various aspects of the disclosure as presented herein to enhance performance, reduce costs and/or size, and/or enhance broadband applications. Each wireless communication devices 702 may have the capacity to function as a client node seeking access to resources (e.g., data, and connection to networked nodes such as servers) via one or more access points 706.

The network connections may include any type and/or form of network and may include any of the following: a point-to-point network, a broadcast network, a telecommunications network, a data communication network, a computer network. The topology of the network may be a bus, star, or ring network topology. The network may be of any such network topology as known to those ordinarily skilled in the art capable of supporting the operations described herein. In some embodiments, different types of data may be transmitted via different protocols. In other embodiments, the same types of data may be transmitted via different protocols.

Figure 7B:
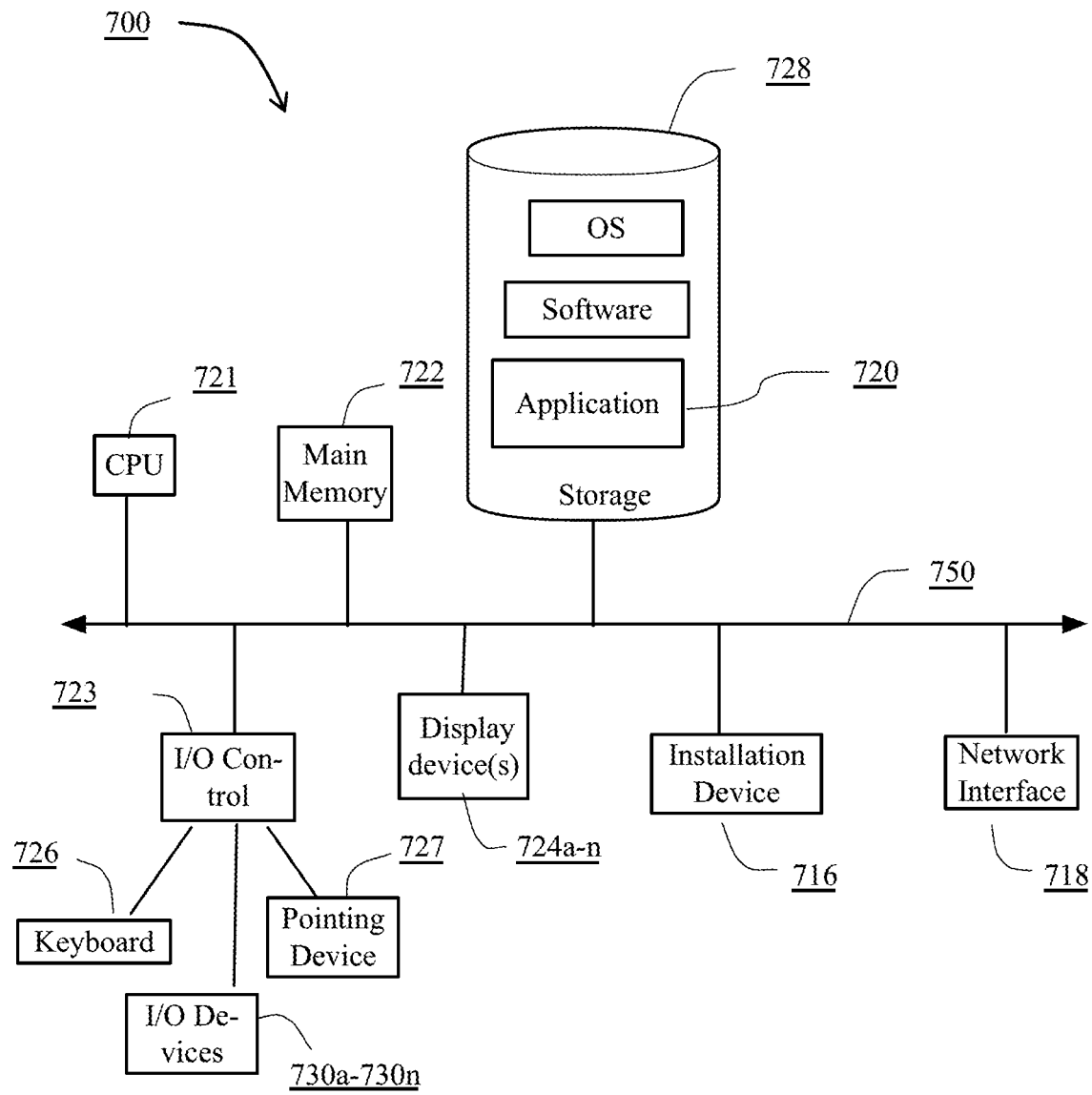
FIGS. 7B and 7C are block diagrams depicting embodiments of computing devices useful in connection with the methods and systems described herein.
Figure 7C:
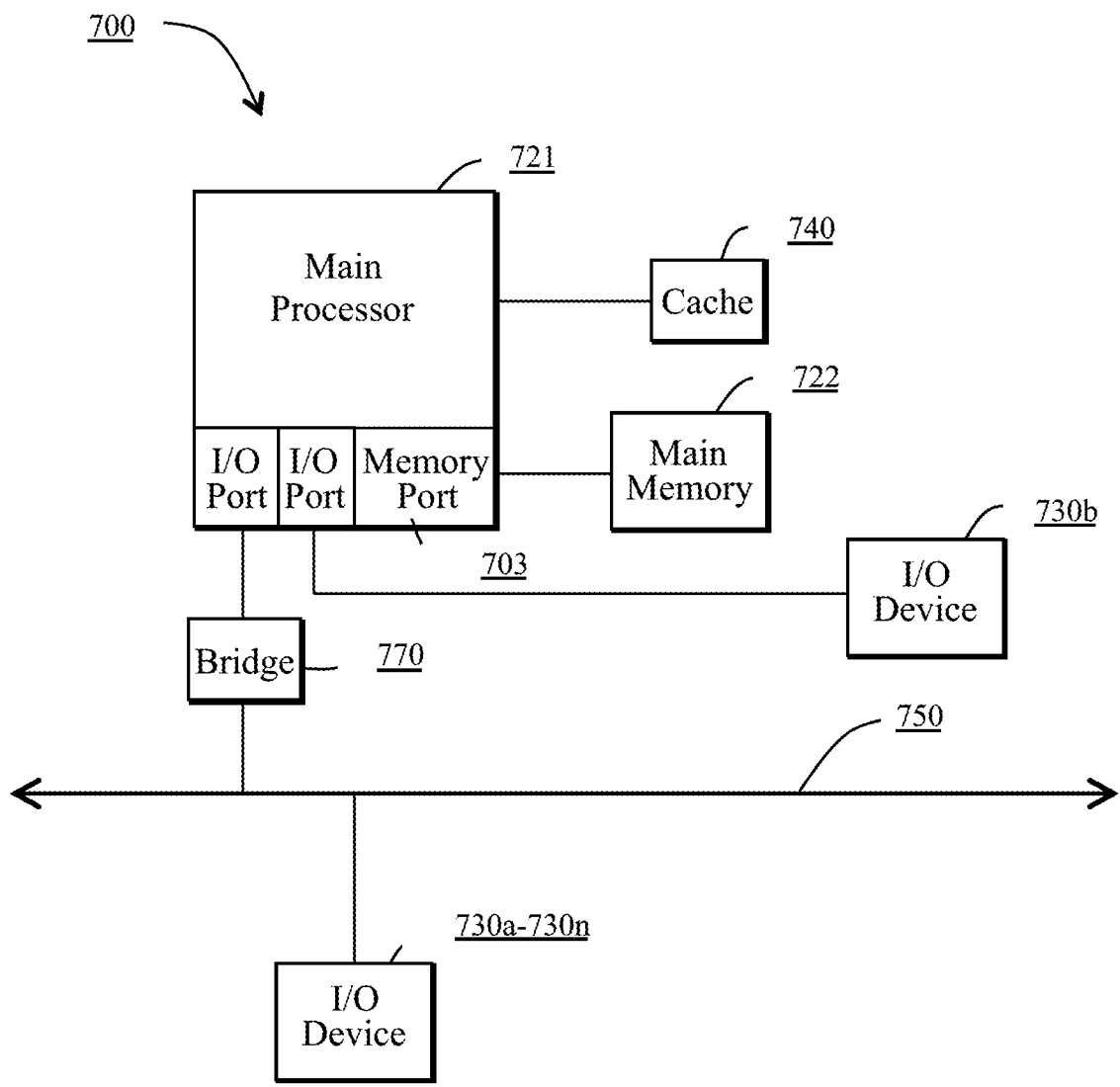

The communications device(s) 702 and access point(s) 706 may be deployed as and/or executed on any type and form of computing device, such as a computer, network device or appliance capable of communicating on any type and form of network and performing the operations described herein. FIGS. 7B and 7C depict block diagrams of a computing device 700 useful for practicing an embodiment of the wireless communication devices 702 or the access point 706. As shown in FIGS. 7B and 7C, each computing device 700 includes a central processing unit 721, and a main memory unit 722. As shown in FIG. 7B, a computing device 700 may include a storage device 728, an installation device 716, a network interface 718, an I/O controller 723, display devices 724a-724n, a keyboard 726 and a pointing device 727, such as a mouse. The storage device 728 may include, without limitation, an operating system and/or software. As shown in FIG. 7C, each computing device 700 may also include additional optional elements, such as a memory port 703, a bridge 770, one or more input/output devices 730a-730n (generally referred to using reference numeral 730), and a cache memory 740 in communication with the central processing unit 721.

The central processing unit 721 is any logic circuitry that responds to and processes instructions fetched from the main memory unit 722. In many embodiments, the central processing unit 721 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 700 may be based on any of these processors, or any other processor capable of operating as described herein.

Main memory unit 722 may be one or more memory chips capable of storing data and allowing any storage location to be directly accessed by the microprocessor 721, such as any type or variant of Static random access memory (SRAM), Dynamic random access memory (DRAM), Ferroelectric RAM (FRAM), NAND Flash, NOR Flash and Solid State Drives (SSD). The main memory 722 may be based on any of the above-described memory chips, or any other available memory chips capable of operating as described herein. In the embodiment shown in FIG. 7B, the processor 721 communicates with main memory 722 via a system bus 750 (described in more detail below). FIG. 7C depicts an embodiment of a computing device 700 in which the processor communicates directly with main memory 722 via a memory port 703. For example, in FIG. 7C the main memory 722 may be DRDRAM.

FIG. 7C depicts an embodiment in which the main processor 721 communicates directly with cache memory 740 via a secondary bus, sometimes referred to as a backside bus. In other embodiments, the main processor 721 communicates with cache memory 740 using the system bus 750. Cache memory 740 typically has a faster response time than main memory 722 and is provided by, for example, SRAM, BSRAM, or EDRAM. In the embodiment shown in FIG. 7C, the processor 721 communicates with various I/O devices 730 via a local system bus 750. Various buses may be used to connect the central processing unit 721 to any of the I/O devices 730, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 724, the processor 721 may use an Advanced Graphics Port (AGP) to communicate with the display 724. FIG. 7C depicts an embodiment of a computer 700 in which the main processor 721 may communicate directly with I/O device 730b, for example via HYPERTRANSPORT, RAPIDIO, or INFINIBAND communications technology. FIG. 7C also depicts an embodiment in which local busses and direct communication are mixed: the processor 721 communicates with I/O device 730a using a local interconnect bus while communicating with I/O device 730b directly.

A wide variety of I/O devices 730a-730n may be present in the computing device 700. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 723 as shown in FIG. 7B. The I/O controller may control one or more I/O devices such as a keyboard 726 and a pointing device 727, e.g., a mouse or optical pen. Furthermore, an I/O device may also provide storage and/or an installation medium 716 for the computing device 700. In still other embodiments, the computing device 700 may provide USB connections (not shown) to receive handheld USB storage devices such as the USB Flash Drive line of devices manufactured by Twintech Industry, Inc. of Los Alamitos, California.

Referring again to FIG. 7B, the computing device 700 may support any suitable installation device 716, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 700 may further include a storage device, such as one or more hard disk drives or redundant arrays of independent disks, for storing an operating system and other related software, and for storing application software programs such as any program or software 720 for implementing (e.g., configured and/or designed for) the systems and methods described herein. Optionally, any of the installation devices 716 could also be used as the storage device. Additionally, the operating system and the software can be run from a bootable medium.

Furthermore, the computing device 700 may include a network interface 718 to interface to the network 704 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 700 communicates with other computing devices 700' via any type and/or form of gateway or tunneling protocol such as Secure Socket Layer (SSL) or Transport Layer Security (TLS). The network interface 718 may include a built-in network adapter, network interface card, PCMCIA network card, card bus network adapter, wireless network adapter, USB network adapter, modem or any other device suitable for interfacing the computing device 700 to any type of network capable of communication and performing the operations described herein.

In some embodiments, the computing device 700 may include or be connected to one or more display devices 724a-724n. As such, any of the I/O devices 730a-730n and/or the I/O controller 723 may include any type and/or form of suitable hardware, software, or combination of hardware and software to support, enable or provide for the connection and use of the display device(s) 724a-724n by the computing device 700. For example, the computing device 700 may include any type and/or form of video adapter, video card, driver, and/or library to interface, communicate, connect or otherwise use the display device(s) 724a-724n. In one embodiment, a video adapter may include multiple connectors to interface to the display device(s) 724a-724n. In other embodiments, the computing device 700 may include multiple video adapters, with each video adapter connected to the display device(s) 724a-724n. In some embodiments, any portion of the operating system of the computing device 700 may be configured for using multiple displays 724a-724n. One ordinarily skilled in the art will recognize and appreciate the various ways and embodiments that a computing device 700 may be configured to have one or more display devices 724a-724n.

In further embodiments, an I/O device 730 may be a bridge between the system bus 750 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 700 of the sort depicted in FIGS. 7B and 7C may operate under the control of an operating system, which control scheduling of tasks and access to system resources. The computing device 700 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 700 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 700 has sufficient processor power and memory capacity to perform the operations described herein.

In some embodiments, the computing device 700 may have different processors, operating systems, and input devices consistent with the device. For example, in one embodiment, the computing device 700 is a smart phone, mobile device, tablet or personal digital assistant. In still other embodiments, the computing device 700 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 700 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above-described embodiments, methods, and examples, but by all embodiments and methods within the scope and spirit of the disclosure.

We claim:

1. A method for enhanced distributed channel access (EDCA) termination signaling, the method comprising:
   receiving, by a first device, at least one EDCA parameter set provided by a second device; and
   transmitting, by the first device to the second device, a transmit EDCA management or control field prior to expiration of an EDCA timeout to effect termination.

2. The method of claim 1, wherein the transmit EDCA management or control field is provided in an orthogonal frequency-division multiple access (OFDMA) message indicating a solicited termination.

3. The method of claim 1, wherein the transmit EDCA management or control field is provided in a random access signal.

4. The method of claim 1, wherein the transmit EDCA management or control field is provided in a frame having a multi-user EDCA control field comprising a predetermined bit value.

5. The method of claim 1, further comprising transmitting, by the second device to the first device prior to expiration of the EDCA timeout, a termination trigger to effect termination.

6. The method of claim 1, wherein the transmit EDCA management or control field is provided in a multi-user EDCA management frame.

7. The method of claim 1, wherein the first device is a station device.

8. The method of claim 1, wherein the transmit EDCA management or control field comprises a multi-user EDCA control field.

9. The method of claim 1, wherein the transmit EDCA management or control field is provided in a probe request.

10. The method of claim 1, wherein the second device is an access point.

11. A first device comprising a wireless communication interface and a processor, wherein the processor is configured to:
    transmit at least one EDCA parameter set received to a second device; and
    receive from the second device a transmit EDCA management or control field prior to expiration of an EDCA timeout signal from the second device to effect termination.

12. The first device of claim 11, wherein the transmit EDCA management or control field is provided in a basic trigger frame comprising a predetermined bit value.

13. The first device of claim 11, wherein the transmit EDCA management or control field is provided in an a multi-user EDCA management frame comprising a predetermined bit value.

14. The first device of claim 11, wherein the EDCA management or control field is part of a frame having a multi-user EDCA control field comprising a predetermined bit value.

15. The first device of claim 11, wherein the transmit EDCA management or control field is provided in an EDCA management frame.

16. The first device of claim 15, wherein the EDCA management or control field is part of a probe request.

17. A first device comprising a wireless communication interface and a processor, wherein the processor is configured to:
    receive at least one EDCA parameter set received transmitted by a second device;
    transmit to the second device a transmit EDCA management or control field prior to expiration of an EDCA timeout; and
    terminate use of the at least one EDCA parameter set.

18. The first device of claim 17, wherein the transmit EDCA management or control field is provided in a probe request.

19. The first device of claim 17, wherein the transmit EDCA management or control field is provided in a multi-user EDCA management frame comprising a predetermined bit value.

20. The first device of claim 17, wherein the EDCA management or control field is part of a frame having a multi-user EDCA control field comprising a predetermined bit value.

* * * * *